(12) United States Patent
Dubosc et al.

(10) Patent No.: US 9,091,407 B2
(45) Date of Patent: Jul. 28, 2015

(54) LIGHT DEVICE WITH 3D EFFECT FOR A MOTOR VEHICLE

(71) Applicant: Valeo Vision, Bobigny Cedex (FR)

(72) Inventors: Christophe Dubosc, Villemomble (FR); Pierre Louis Tassy, Asnieres sur Seine (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 14/030,021

(22) Filed: Sep. 18, 2013

(65) Prior Publication Data

US 2014/0085916 A1    Mar. 27, 2014

(30) Foreign Application Priority Data

Sep. 21, 2012  (FR) .................................... 12 58900

(51) Int. Cl.
| | |
|---|---|
| *F21S 8/10* | (2006.01) |
| *B60Q 3/00* | (2006.01) |
| *B60Q 3/02* | (2006.01) |
| *G02B 27/22* | (2006.01) |

(52) U.S. Cl.
CPC ................ *F21S 48/23* (2013.01); *B60Q 3/004* (2013.01); *B60Q 3/0283* (2013.01); *F21S 48/00* (2013.01); *F21S 48/217* (2013.01); *F21S 48/2237* (2013.01); *F21S 48/2268* (2013.01); *F21S 48/2287* (2013.01); *F21S 48/24* (2013.01); *G02B 27/2221* (2013.01); *G02B 27/2235* (2013.01)

(58) Field of Classification Search
CPC . B60Q 1/0011; B60Q 1/2619; F21S 48/2225; F21S 48/225; F21S 48/2262

USPC .......... 362/511, 514, 517, 346, 307, 300, 298
See application file for complete search history.

(56) References Cited

U.S. PATENT DOCUMENTS

| | | | |
|---|---|---|---|
| 2,286,247 | A | 6/1942 | Yearta |
| 6,779,902 | B2 | 8/2004 | Cha et al. |
| 7,220,043 | B2 | 5/2007 | Cha et al. |
| 8,475,020 | B2 | 7/2013 | Dubosc |
| 2002/0191387 | A1 | 12/2002 | Cha et al. |
| 2005/0002176 | A1 | 1/2005 | Cha et al. |
| 2007/0284169 | A1* | 12/2007 | Zabiega ......................... 180/90 |
| 2008/0094842 | A1 | 4/2008 | King et al. |
| 2009/0229153 | A1 | 9/2009 | Suzuki et al. |
| 2011/0149585 | A1 | 6/2011 | Dubosc |
| 2011/0304784 | A1* | 12/2011 | Hirota et al. .................... 349/15 |

FOREIGN PATENT DOCUMENTS

| | | |
|---|---|---|
| EP | 1916471 | 4/2008 |
| EP | 2336632 | 6/2011 |
| JP | 63068688 | 5/1988 |

* cited by examiner

*Primary Examiner* — Tracie Y Green
(74) *Attorney, Agent, or Firm* — Jacox, Meckstroth & Jenkins

(57) ABSTRACT

The invention deals with a light module, notably for motor vehicles, comprising a reflector with a reflecting surface , a screen arranged facing the reflector, the screen a semi-reflecting area, and a light guide extending longitudinally along the screen and the reflector. The guide comprises a diffusing output face extending transversally from the semi-reflecting area of the screen to the reflector. A portion of the rays exiting from the output face passes through the semi-transparent area, the other portion being also reflected toward the reflecting surface to form successive images with a depth effect of 3D type, without dark areas between these images.

24 Claims, 2 Drawing Sheets

LIGHT DEVICE WITH 3D EFFECT FOR A MOTOR VEHICLE

CROSS-REFERENCE TO RELATED APPLICATIONS

This application claims priority to French Application No. 1258900 filed Sep. 21, 2012.

BACKGROUND OF THE INVENTION

1. Field of the Invention

The invention deals with a light module, notably for a motor vehicle. More particularly, the invention deals with an interior lighting module of the vehicle, such as a roof light or a side fixture, or even a signaling module of the "position" (or "side marker") type and/or of the "stop" light type for vehicles. Even more particularly, the invention deals with a signaling device generating a depth effect in three dimensions by virtue of a particular optical device. The invention also deals with a signaling device comprising such a module.

2. Description of the Related Art

The patent document EP 1 916 471 A1, which is equivalent to U.S. Publication No. 2008/0094842, describes a rear light of the "side marker" type comprising a cavity formed by a reflector and a screen arranged at a distance from the reflector. The screen has the particular feature of being semi-transparent, which means that a portion of the light rays encountering it is reflected and another portion is transmitted. The cavity exhibits the particular feature that one of the surfaces of the reflector and of the screen which delimit the cavity is dome-shaped. A series of light sources of light-emitting diode type is arranged at the periphery of the reflector and oriented in such a way as to emit the light generally toward the screen. Given the semi-reflecting nature thereof, one portion of the light rays is directly transmitted and one portion is reflected toward the reflector. The latter then reflects these rays toward the screen with an offset directed toward the center of the reflector. These rays reflected by the reflector once again encounter the screen. Like the light rays originating directly from the light sources, a portion of the rays is transmitted by the screen and a portion is reflected toward the reflector, and so on.

The result of these multiple partial transmissions and partial reflections is an optical effect of depth in three dimensions. The lighting or illumination power of the light rays emitted decreases progressively with the ongoing reflections in the cavity. This optical effect is interesting because it allows for a customization of the "side marker" light attracting the attention of other drivers. It also allows for the "side marker" light to be concealed in a bodywork element, such as a motor vehicle bumper or wing. It also allows for the production of a signaling device of small thickness and of small bulk compared to the depth effect generated.

In practice, the semi-transparent nature of the screen is obtained by the application of a metallic covering which can give it a metalized appearance similar to that of a bodywork element. The image formed by this rear light does however exhibit unlit portions. In practice, the areas of transition between the images that are repeated are not lit. From a photometric viewpoint, this means that a not-inconsiderable portion of the outer surface of the light does not participate in the signaling, which can in some cases lead to type-approval difficulties, notably for a "stop" function.

Furthermore, from a viewpoint of style and ability to draw the attention of other road users, it may be desirable to provide images that are less intermittent from a light intensity viewpoint.

SUMMARY OF THE INVENTION

The aim of the invention is to propose a light module that mitigates at least one of the abovementioned drawbacks. More particularly, the aim of the embodiment of the invention is to propose a light module capable of generating an enhanced light image, notably from a photometry and/or style viewpoint.

The subject of the invention is a light signaling or interior lighting module, notably for motor vehicles, comprising: a reflector with a reflecting surface; a screen arranged facing the reflector, the screen comprising a semi-reflecting area; radiating means capable of sending light rays between the reflector and the screen, some of said rays being transmitted directly through the semi-reflecting area, other of said rays being reflected by the semi-reflecting area toward the reflector which returns them again to the semi-reflecting area, so as to generate a repetitive visual effect of depth; noteworthy in that the radiating means comprise at least one light-emitting device comprising a light ray-emitting face, extending from the semi-reflecting area of the screen to the reflector.

According to an advantageous embodiment of the invention, the light-emitting device comprises a light guide comprising an output face corresponding to the light-emitting face, said guide being able to be passed through by the light rays and to transmit them through the output face.

According to an exemplary embodiment of the invention, a light source is arranged at one end of the guide. It may be, for example, one or more incandescent lamps or even one or more light-emitting diodes. A significant portion of the light rays emitted by the light source passes through the input face of the light guide, arranged facing the light source. The light-emitting diodes allow for a simpler embodiment of the device.

According to an exemplary arrangement of the guide and of the light source, the light rays can then be propagated in the transparent material of the guide, by successive internal reflections on the walls of the guide, notably in directions that are mostly oriented according to the longitudinal axis of the guide, the rays then being propagated in the guide, notably along the guide. The light guide may comprise decoupling means, such as reflection facets on its rear face, opposite the output face of the rays. These decoupling means are configured to ensure a reflection of a portion of the rays traveling along the guide, toward the output face, so as to make them exit from the guide.

According to an advantageous embodiment of the invention, the light-emitting device comprises a surface light source, notably an organic light-emitting diode (OLED), comprising a surface, notably the luminous surface in the context of an organic light-emitting diode (OLED), corresponding to the light-emitting face.

According to an advantageous embodiment of the invention, the light rays exiting from the light-emitting device through the emitting face are distributed essentially over all of the surface of said face situated between the reflector and the semi-reflecting area of the screen.

According to an advantageous embodiment of the invention, the light-emitting device extends longitudinally along the screen and the reflector.

According to an advantageous embodiment of the invention, the light-emitting device extends transversally from the semi-reflecting area of the screen to the reflector.

According to one embodiment of the invention, the emitting face of the light-emitting device or devices is inclined toward said semi-reflecting area.

According to one embodiment of the invention, the emitting face of the light-emitting device or devices is inclined toward the reflector.

According to an advantageous embodiment of the invention, the emitting face of the or of at least one of the light-emitting devices is arranged along an edge of the reflector and/or of the semi-reflecting area of the screen.

According to an advantageous embodiment of the invention, the edge of the reflector is set back relative to the corresponding edge of the semi-reflecting area of the screen, so that the emitting face of the or of at least one of the light-emitting devices, arranged along said edges, is inclined toward said semi-reflecting area.

According to an advantageous embodiment of the invention, the edge of the semi-reflecting area is set back relative to the corresponding edge of the screen of the reflector, so that the emitting face of the or of at least one of the light-emitting devices, arranged along said edges, is inclined toward said reflector.

According to an advantageous embodiment of the invention, the emitting face forms an average angle with the semi-reflecting area of the screen of between 30° and 60°.

According to an advantageous embodiment of the invention, the screen is generally flat and the reflecting surface is generally convex or concave.

According to an advantageous embodiment of the invention, the emitting face of the or of at least one of the light-emitting devices forms a diffusing surface, for example a grained surface, obtained notably by graining or by sandblasting. The diffusing surface may also be a surface obtained by the deposition of a diffusing lacquer on the surface intended to diffuse.

According to an advantageous embodiment of the invention, the diffusing properties of the emitting face are essentially constant over all of the face.

According to an advantageous embodiment of the invention, the or at least one of the light-emitting devices comprises a rear face opposite the output face, comprising reflection surfaces for reflecting the light rays toward the emitting face, said rear face being wider than the emitting face.

According to an advantageous embodiment of the invention, the or at least one of the light-emitting devices has, over the majority of its length, a trapezoidal cross section, the emitting face corresponding to the smaller of the two bases of the trapezium.

According to an advantageous embodiment of the invention, the trapezoidal section of the light-emitting device or devices varies along said guide or guides as a function of the space available between the reflector and the semi-reflecting area of the screen.

An interior lighting module of a vehicle, notably of the vehicle passenger compartment, such as a roof light or a side fixture, characterized in that it conforms to the invention.

Another subject of the invention is a light device, notably an interior lighting device for a motor vehicle, comprising a module according to the invention.

Another subject of the invention is a signaling device for a motor vehicle comprising a module according to the invention.

The features of the invention are advantageous in that they make it possible to produce a light module with depth effect, which is particularly efficient from a brightness and style viewpoint.

These and other objects and advantages of the invention will be apparent from the following description, the accompanying drawings and the appended claims.

BRIEF DESCRIPTION OF THE ACCOMPANYING DRAWINGS

Other features and advantages of the present invention will be better understood from the description and the drawings, in which.

DETAILED DESCRIPTION OF THE PREFERRED EMBODIMENTS

The exemplary embodiment of the invention illustrated in the figures is deliberately simplified and schematic in the interests of clarity of explanation of the invention. In practice, the various constituent elements of the invention will be able to take substantially more complex forms, notably because of the various dimensioning-related constraints.

Figure 1:
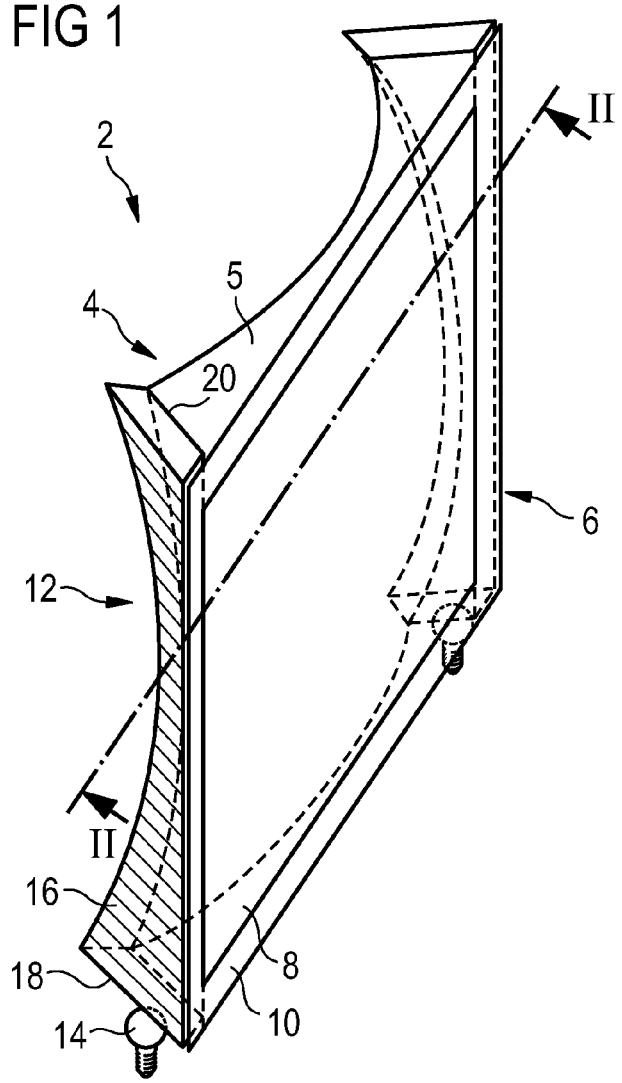
FIG. 1 is a perspective illustration of a light module according to the invention.

The light module 2 illustrated in FIG. 1 essentially comprises a reflector 4 with a reflecting surface 5 and a screen 6 extending facing the reflecting surface 5. The screen comprises a semi-reflecting area 8 surrounded by a mask 10. The screen is generally flat and the reflecting surface 5 is generally convex. The screen 6 and the reflector 4 form a quadrilateral in which two opposite edges are each provided with a light-emitting device 12. The latter extends longitudinally along the corresponding edges of or facing the semi-transparent area 8 and the reflecting surface 5. The light-emitting device 12 also extends transversally from the edge of the reflecting surface 5 to the edge of the semi-transparent area 8, so as to cover essentially all of the space between these two edges.

Generally, in the invention as a whole, the screen 6 can be produced with a transparent material that is commonly used, such as, for example, certain plastics or glass. One of its surfaces, the outer or inner surface, is made semi-transparent by the application of a coating that is typically partially reflecting. The coating is usually a metallic coating such as aluminum or a stainless metal applied by vacuum vapor deposition technique. Various coating application methods known to a person skilled in the art can be used. When the reflection rate increases, more repetitions of the patterns can be obtained. The reflection rate of the coating is preferentially greater than 15%, preferentially greater than 50%. When the reflection rate decreases, more brightness can be obtained. Preferentially, the reflection rate is less than 95%. With a reflection rate less than 80%, a better brightness is obtained, for example for a signaling function. For the functions used according to the invention, notably interior lighting or signaling, the reflection rate can be between 15 and 80%, preferentially between 50% and 80%. In the context of signaling functions, the reflection rate is preferentially between 70 and 80%, preferentially approximately 75%.

The light-emitting devices 12 can be light guides. A light source 14 is arranged at one of the ends of each of the two guides 12. It can be, for example, one or more incandescent lamps or even one or more light-emitting diodes. A significant portion of the light rays emitted by the light source 14 passes through the input face 18 of the light guide 12, arranged facing the light source 14. The light rays can then be propagated in the transparent material of the guide, by internal reflection on the walls of the guide in directions that are mostly oriented according to the longitudinal axis of the guide. The rays encountering the dioptre formed by the outer surface of the guide and the ambient outside air are reflected in as much as they are incident according to an angle greater than the refraction limit angle, according to the total reflection principle. The surface of the guide in fact forms a dioptre between the material of the guide with a given refractive index (typically of the order of 1.6 for polycarbonate) and the ambient air with a different refractive index (equal to 1). This difference in refractive index between two contiguous media causes there to be a limiting angle of incidence beyond which the refraction is impossible and for which there is total reflection. In the case of a medium in polycarbonate surrounded by air, this limiting angle is of the order of 38° (according to the Snell-Descartes Law).

The light rays can thus travel essentially longitudinally by successive reflections on opposite faces of the guide. The light guide 12 comprises reflection facets 16 on its rear face, opposite the output face of the rays 20. These facets are configured to ensure a reflection of a portion of the rays traveling along the guide, toward the output face 20 so as to make them exit from the guide. They can be covered with a reflecting coating. This type of facet is well known per se to a person skilled in the art, so a more detailed description is not necessary. Each of the two guides 12 is thus configured for the light rays emitted by the respective light source or sources to be propagated longitudinally in the guide and progressively exit laterally through the output face.

Figure 2:
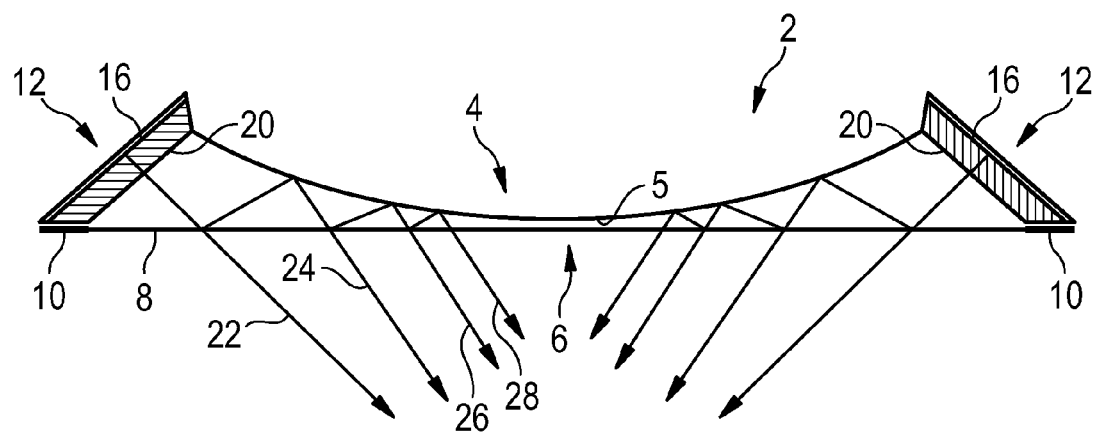
FIG. 2 is a cross-sectional view along the axis II-II of the module of FIG. 1, illustrating the general principle of the image generation with depth effect.

FIG. 2 is a cross-sectional view along the axis II-II of the module of FIG. 1, illustrating the general principle of the image generation with depth effect or even with three dimensions. In practice, a ray 22 that is propagated along the guide and reflected by one of the facets 16 is represented. It exits from the output face 20 to encounter the semi-reflecting area 8 of the screen 6. The ray will then partially pass through the screen and partially be reflected toward the reflecting surface 5. The latter will then reflect (essentially totally) this ray toward the screen. The duly reflected ray 24 will, similarly to the initial ray 22, partially pass through the screen and partially be reflected toward the reflecting surface 5. The reflected portion of the ray 24 will be reflected by the reflecting surface 5 to form the ray 26 which will partially pass through the screen and partially be reflected to then form the ray 28, and so on. An observer watching the outer surface of the screen 6 will then see a succession of images of the reflection facets 16, that is to say, essentially vertical lines with transversal striae, the width and intensity of the vertical lines decreasing progressively from the direct image formed notably by the ray 22 to the images reflected and potentially deformed by the convex reflecting surface 5, these images being formed notably by the rays 24, 26 and 28.

FIG. 2 illustrates a single ray exiting from the output face, it being understood, however, that a multitude of rays exit from said face, and do so in different directions, thus forming essentially complete images of the facet 16 situated at the cut, these images then being visible from different observation angles. The output face 20 of the light guide extending from the edge of the reflecting surface 5 to the corresponding edge of the semi-reflecting area 8 makes it possible to minimize, even cancel out, the unlit areas between the successive images of the facets 16, as will be detailed in relation to FIG. 3. The right-hand part of FIG. 2 is essentially symmetrical relative to the left-hand part, the same phenomenon can therefore be seen therein.

Figure 3:
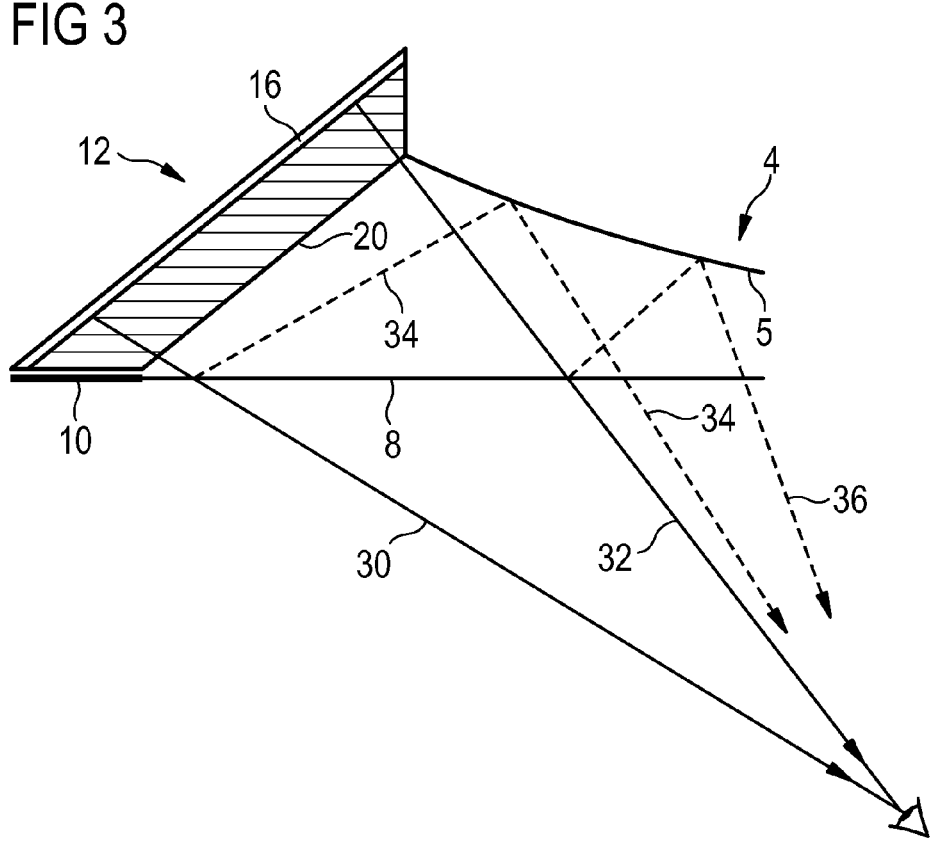
FIG. 3 is an enlargement of the left-hand portion of FIG. 2, illustrating a first aspect of the construction of the light image.

FIG. 3 is an enlargement of the left-hand portion of FIG. 2, illustrating a first aspect of the construction of the light image. A first ray 30 exiting from the end of the output face 20, adjacent to the semi-transparent area 8, is represented. It is directed toward an observer schematically represented by a viewpoint. A second ray 32 exiting from the other end of the output face 20, adjacent to the reflecting surface 5 and directed toward the observer, is also represented. These rays are obviously only a portion of the rays reflected by the facet or facets 16 at this height of the light guide. The observer thus perceives an image of the facet or facets 16 with little or no deformation. The first ray 30, when it encounters the semi-reflecting area 8, is partially reflected in a ray 34 toward the reflecting surface 5. The latter is then once again reflected therein and partially passes through the semi-reflecting area 8 to reach the eye of the observer. The same applies for the second ray 32 which is partially reflected by the semi-transparent area 8 in a ray 36 which also reaches the eye of the observer. The latter thus perceives two images, namely a first image of the reflection facets 16 by transmission notably along the rays 30 and 32, and a second image of said facets, this image being reversed by a double reflection on the semi-transparent area and the reflecting surface and formed notably by the rays 34 and 36. It can be seen that the distance between these two images is reduced, which makes it possible to achieve an enhanced style and photometry. Depending on the geometry of the module and also the position of the observer, the distance between these two images may be zero or almost zero. They may also be overlaid. Additional images may also be formed, similarly to the principle which has just been explained.

Figure 4:
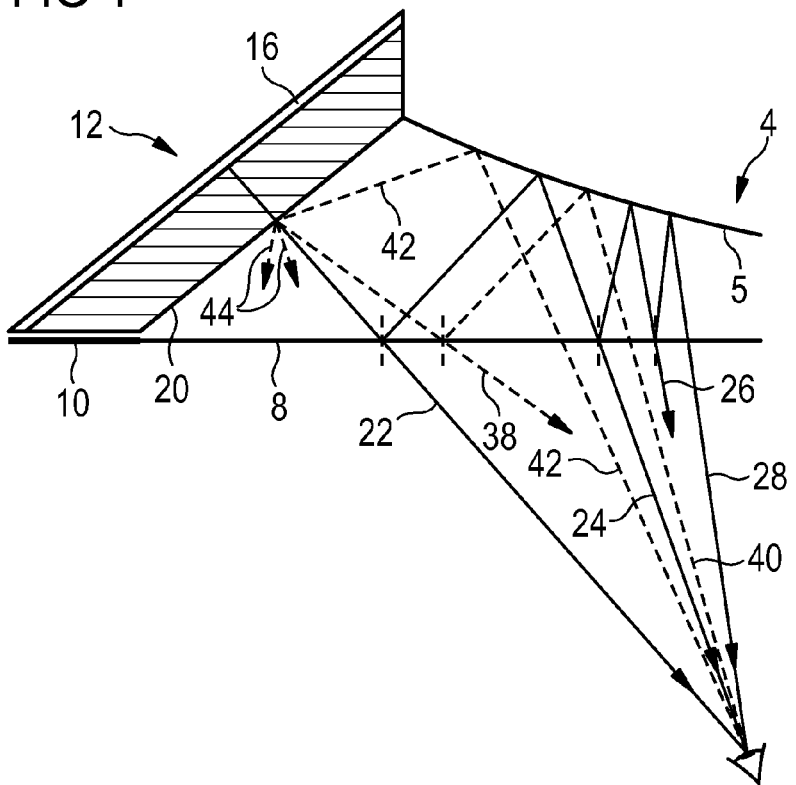
FIG. 4 is, similarly to FIG. 3, an enlargement of the left-hand portion of FIG. 2, illustrating a second aspect of the construction of the light image.

FIG. 4 is a representation of the left-hand portion of FIG. 2, similarly to FIG. 3, and illustrates a second aspect of the construction of the light image. In practice, the output face 20 of the light guide may be diffusing and thus form a surface light source. FIG. 4 shows a ray 22 reflected by the reflection facet 16. At the point of passage of this ray through the output face 20, the ray is transmitted and refracted in a large number of directions and the energy of the incident ray is thus redistributed in a multitude of refracted rays. As an example, the ray 38 encounters the semi-reflecting area 8 at a point other than the ray 22 transmitted without deviation. It is then partially transmitted and partially reflected. The ray thus reflected toward the reflecting surface is once again reflected to form a second image of the facet, which can be seen by the observer of the first image formed by the ray 22. Again as an example, the ray 42 is another ray diffused by the output face 20 from the point of exit of the ray 22, this ray directly encountering the reflecting surface 5 and also being able to form an additional image of the facet 16. The output face will diffuse other rays, such as the rays 44 illustrated in the figure.

The diffusing nature of the output face 20 of the light guide makes it possible to fill the areas that are unlit or only weakly lit between the successive images of the reflection facets.

The image that is thus produced will resemble vertical bars arranged one alongside the other and interlinked, a little like a staircase. This image thus presents a light continuity while retaining its depth effect.

The diffusing nature of the output face of the light guide can be achieved in different ways well known per se to a person skilled in the art, notably by sand blasting, acid etching or even deposition of a coating. The diffusing capability of the surface is essentially characterized by its roughness.

In the exemplary embodiment which has just been described, the module has a rectangular form. It is, however, understood that it can take various forms, notably more complex and notably with rounded contours. The reflecting surface can also take more complex forms than that illustrated in the exemplary embodiment. A person skilled in the art, being familiar with the present invention, will easily be able to proceed with dimensioning notably by calculation of the surfaces to be implemented to produce the module.

In the exemplary embodiment which has just been described, the module comprises two light guides arranged at opposite edges of the surfaces of the module. The latter may, however, comprise only a single light guide extending along a single edge or even extending continuously along several edges. It may also comprise more than two light guides.

It is also possible to use, in place of the guide, a surface light source, in which the surface of the emitting element corresponds to the light-emitting face of the light-emitting device. This surface source may, for example, be an OLED, in an example that is not illustrated, which, compared to the illustration of FIGS. 2, 3 and 4, would extend in place of the light guide 12 between the reflector 4 and the screen 6.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light module, notably for a motor vehicle, comprising:
a reflector with a reflecting surface;
a screen arranged facing the reflector, said screen comprising a semi-reflecting area;
radiating means capable of sending light rays between the reflector and said screen, some of said rays being transmitted directly through the semi-reflecting area, other of said rays being reflected by the semi-reflecting area toward the reflector which returns them again to the semi-reflecting area, so as to generate a repetitive visual effect of depth; wherein
said radiating means comprise at least one light-emitting device comprising a light ray-emitting face, extending from the semi-reflecting area of said screen to the reflector.

2. The light module according to claim 1, wherein said light-emitting device comprises a light guide comprising a light ray-emitting face corresponding to said light ray-emitting face of said radiating means, said guide being able to be passed through by the light rays and to transmit them through said light ray-emitting face.

3. The light module according to claim 1, wherein said light-emitting device comprises a surface light source, notably an organic light-emitting diode, comprising a surface, notably the luminous surface in the context of an organic light-emitting diode, corresponding to said light ray-emitting face.

4. The light module according to claim 1, wherein said light rays exiting from said light-emitting device through the emitting face are distributed essentially over all of the surface of said face situated between the reflector and the semi-reflecting area of the screen.

5. The light module according to claim 1, wherein said light-emitting device extends longitudinally along the screen and the reflector.

6. The light module according to claim 1, wherein said light-emitting device extends transversally from the semi-reflecting area of the screen to the reflector.

7. The light module according to claim 1, wherein said light ray-emitting face of the at least one light-emitting device is arranged along an edge of the reflector and/or of the semi-reflecting area of the screen.

8. The light module according to claim 7, wherein the edge of the reflector is set back relative to the corresponding edge of the semi-reflecting area of the screen, so that the light ray-emitting face of the light-emitting device or devices, arranged along said edges, is inclined toward said semi-reflecting area.

9. The light module according to claim 8, wherein said light ray-emitting face forms an average angle with the semi-reflecting area of the screen of between 30° and 60°.

10. The light module according to claim 1, wherein said reflecting surface is generally convex or concave.

11. The light module according to claim 1, wherein said light ray-emitting face of the at least one light-emitting device forms a diffusing surface.

12. The light module according to claim 1, wherein said light ray-emitting face of the at least one light-emitting device comprises a rear face opposite the output face, comprising reflection surfaces for reflecting the light rays toward said light ray-emitting face and being wider than said light ray-emitting face.

13. The light module according to claim 1, wherein said or at least one of said light-emitting devices has, over the majority of its length, a trapezoidal cross section.

14. An interior lighting module of a vehicle, notably of the vehicle passenger compartment, such as a roof light or a side fixture, wherein it conforms to claim 1.

15. A signaling device for a motor vehicle comprising a light module according to claim 1.

16. The light module according to claim 2, wherein said light rays exiting from the light-emitting device through the light ray-emitting face are distributed essentially over all of the surface of said face situated between the reflector and the semi-reflecting area of the screen.

17. The light module according to claim 3, wherein said light rays exiting from the light-emitting device through the light ray-emitting face are distributed essentially over all of the surface of said face situated between the reflector and the semi-reflecting area of the screen.

18. A light module, notably for a motor vehicle, comprising:
a reflector with a reflecting surface;
a screen arranged facing the reflector, said screen comprising a semi-reflecting area;
at least one light-emitting device capable of sending light rays between the reflector and the screen, some of said rays being transmitted directly through the semi-reflecting area, other of said rays being reflected by the semi-reflecting area toward the reflector which returns them again to the semi-reflecting area, so as to generate a repetitive visual effect of depth; wherein said at least one light-emitting device comprises a light ray-emitting face, extending from the semi-reflecting area of said screen to the reflector.

19. The light module according to claim 18, wherein said at least one light-emitting device comprises a light guide comprising an output face corresponding to said light ray-emitting face, said light guide being able to be passed through by the light rays and to transmit them through said light ray-emitting face.

20. The light module according to claim 18, wherein said at least one light-emitting device comprises a surface light source, notably an organic light-emitting diode, comprising a surface, notably the luminous surface in the context of an organic light-emitting diode, corresponding to said light ray-emitting face.

21. The light module according to claim 18, wherein said light rays exiting from said at least one light-emitting device through the light ray-emitting face are distributed essentially over all of the surface of said face situated between the reflector and the semi-reflecting area of the screen.

22. The light module according to claim 18, wherein said at least one light-emitting device extends longitudinally along the screen and the reflector.

23. The light module according to claim 18, wherein said at least one light-emitting device extends transversally from the semi-reflecting area of the screen to the reflector.

24. The light module according to claim 18, wherein said light ray-emitting face of the at least one light-emitting device is arranged along an edge of the reflector and/or of the semi-reflecting area of the screen.

\* \* \* \* \*